US009164278B2

(12) United States Patent
Shim et al.

(10) Patent No.: US 9,164,278 B2
(45) Date of Patent: *Oct. 20, 2015

(54) MICRO-OPTICAL SWITCHING DEVICE, IMAGE DISPLAY APPARATUS INCLUDING MICRO-OPTICAL SWITCHING DEVICE, AND METHOD OF MANUFACTURING MICRO-OPTICAL SWITCHING DEVICE

(75) Inventors: Dong-sik Shim, Hwaseong-si (KR); Jong-seok Kim, Hwaseong-si (KR); Yong-seop Yoon, Seoul (KR); Hyung Choi, Seongnam-si (KR); Woon-bae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 551 days.

This patent is subject to a terminal disclaimer.

(21) Appl. No.: 13/461,387

(22) Filed: May 1, 2012

(65) Prior Publication Data
US 2013/0070445 A1 Mar. 21, 2013

(30) Foreign Application Priority Data

Sep. 16, 2011 (KR) ........................ 10-2011-0093649

(51) Int. Cl.
*G02B 26/02* (2006.01)
*G02B 26/08* (2006.01)

(52) U.S. Cl.
CPC .................................. *G02B 26/0841* (2013.01)

(58) Field of Classification Search
None
See application file for complete search history.

(56) References Cited

U.S. PATENT DOCUMENTS

| 5,319,491 | A | 6/1994 | Selbrede | |
|---|---|---|---|---|
| 7,042,618 | B2 | 5/2006 | Selbrede et al. | |
| 7,057,790 | B2 | 6/2006 | Selbrede | |
| 7,142,750 | B2 * | 11/2006 | Shahar | 385/37 |
| 7,633,665 | B2 * | 12/2009 | Ogikubo | 359/237 |
| 7,830,589 | B2 * | 11/2010 | Floyd | 359/291 |
| 7,920,317 | B2 * | 4/2011 | Lee et al. | 359/253 |
| 8,254,005 | B2 * | 8/2012 | Wullinger et al. | 359/224.1 |
| 8,390,911 | B2 * | 3/2013 | Tsuboi et al. | 359/221.2 |
| 2008/0062500 | A1 * | 3/2008 | Hagood, IV | 359/230 |
| 2008/0123167 | A1 * | 5/2008 | Weiss et al. | 359/198 |
| 2010/0079849 | A1 * | 4/2010 | Floyd | 359/291 |
| 2010/0315696 | A1 * | 12/2010 | Lee et al. | 359/290 |
| 2013/0329271 | A1 * | 12/2013 | Shim | 359/230 |
| 2014/0085698 | A1 * | 3/2014 | Wu et al. | 359/230 |

FOREIGN PATENT DOCUMENTS

| JP | 11064746 A | 3/1999 |
|---|---|---|
| JP | 11326791 A | 11/1999 |
| JP | 2001305441 A | 10/2001 |
| KR | 1020110015318 A | 2/2011 |
| WO | 0205008 A1 | 1/2002 |

* cited by examiner

*Primary Examiner* — Jennifer L. Doak
(74) *Attorney, Agent, or Firm* — Sughrue Mion, PLLC

(57) ABSTRACT

A micro-optical switching device, an image display apparatus including the micro-optical switching device, and a method of manufacturing the micro-optical switching device are provided. The micro-optical switching device includes a substrate; a first electrode disposed on the substrate and including a first opening array, wherein the first opening array includes a plurality of openings; and a second electrode disposed spaced apart from the first electrode and including a second opening array including a plurality of openings, wherein the plurality of openings of the second opening array do not overlap with the plurality of openings of the first opening array.

23 Claims, 7 Drawing Sheets

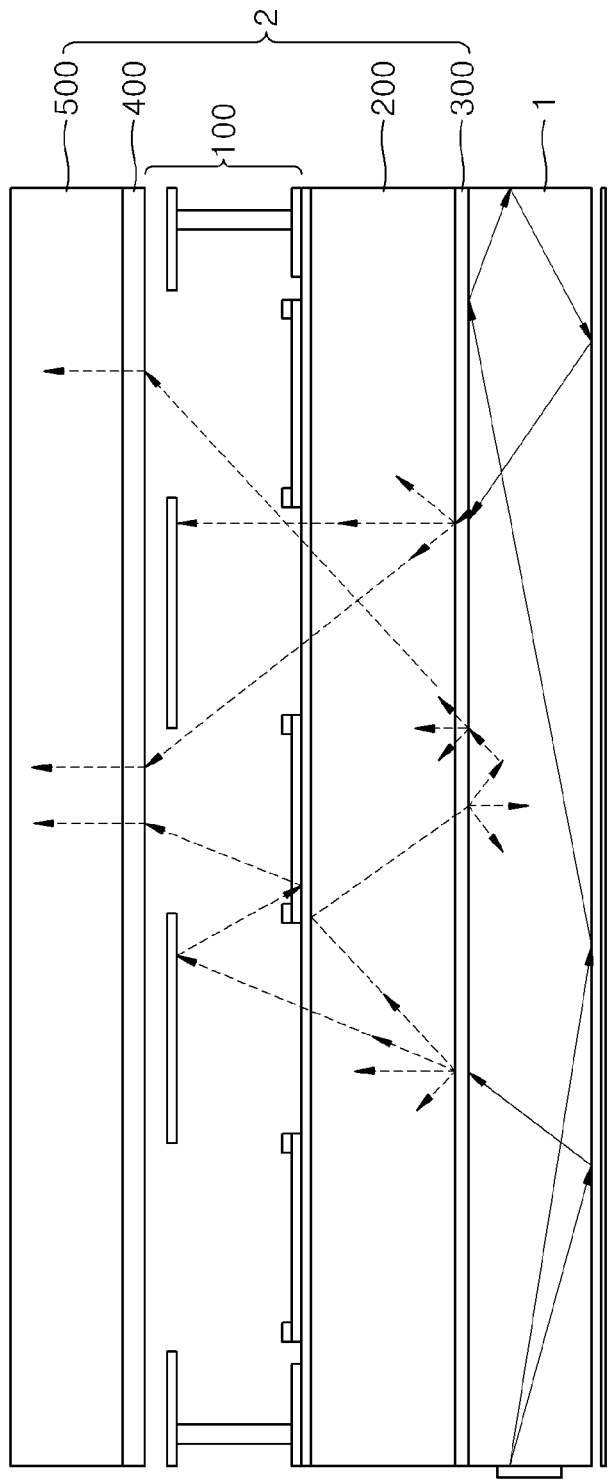

MICRO-OPTICAL SWITCHING DEVICE, IMAGE DISPLAY APPARATUS INCLUDING MICRO-OPTICAL SWITCHING DEVICE, AND METHOD OF MANUFACTURING MICRO-OPTICAL SWITCHING DEVICE

CROSS-REFERENCE TO RELATED APPLICATION

This application claims priority from Korean Patent Application No. 10-2011-0093649, filed on Sep. 16, 2011, in the Korean Intellectual Property Office, the disclosure of which is incorporated herein in its entirety by reference.

BACKGROUND

1. Field

Apparatuses and methods consistent with exemplary embodiments relate to micro-optical switching devices, image display apparatuses including the micro-optical switching devices, and methods of manufacturing the micro-optical switching devices.

2. Description of the Related Art

Display apparatuses have been developed from cathode ray tube (CRT) methods that use an existing CRT in flat display apparatuses, such as liquid crystal display (LCD) apparatuses, plasma display panel (PDP) apparatuses, and the like. Display apparatuses that use CRT methods display an image by making electron beams collide with fluorescent materials. As the sizes of display apparatuses that use CRT methods increase, their widths increase greatly, and thus it is not easy to manufacture large display apparatuses. In order to solve this problem, a plurality of flat display apparatuses have been developed.

Although the amount of power consumption of a display panel with respect to the total amount of power consumption of a flat display apparatus increases continuously, the luminescent efficiency of the display panel is very low. In particular, as the sizes of pixels decrease, the luminescent efficiency of the display panel is rapidly lowered.

Thus, micro-optical switching devices for use in display apparatuses with improved luminescent efficiency and simplified manufacturing processes have to be developed.

SUMMARY

One or more exemplary embodiments provide micro-optical switching devices with improved luminescent efficiency.

One or more exemplary embodiments provide image display apparatuses with improved luminescent efficiency.

One or more exemplary embodiments provide methods of manufacturing micro-optical switching devices with simplified manufacturing processes.

Additional aspects will be set forth in part in the description which follows and, in part, will be apparent from the description, or may be learned by practice of the presented embodiments.

According to an aspect of an exemplary embodiment, a micro-optical switching device includes: a substrate; a first electrode disposed on the substrate and includes a first opening array including a plurality of openings; and a second electrode disposed spaced apart from the first electrode and includes a second opening array including a plurality of openings, wherein the plurality of openings of the second opening array do not overlap with the plurality of openings of the first opening array.

The micro-optical switching device may further include a support member that supports the second electrode in such a way that the second electrode is spaced apart from the first electrode by a predetermined distance.

The support member may include: a first support member that is disposed on the substrate and has a greater thickness than a thickness of the first electrode; and a second support member that is disposed on the first support member and is connected to the second electrode.

The support member may include the same material as that used in forming the second electrode.

The support member may be formed of elastic polymer.

The second electrode may be moved toward or away from the first electrode based on a voltage applied to the micro-optical switching device.

When a voltage is applied to the micro-optical switching device, the second electrode may be moved toward the first electrode, and when no voltage is applied to the micro-optical switching device, the second electrode may be moved away from the first electrode.

Each of the first electrode and the second electrode may include an opaque material.

The first electrode and the second electrode may be coated with a reflective material.

The micro-optical switching device may further include a spacer that is disposed between the first electrode and the second electrode and prevents electrical shorts between the first electrode and the second electrode.

The spacer may be disposed in a region in which the first electrode and the second electrode overlap with each other.

The spacer may be disposed on a top surface of the first electrode or bottom surface of the second electrode.

The spacer may include: a first surface that is disposed on the bottom surface of the second electrode or top surface of the first electrode; and a second surface opposite the first surface and is coated with material that prevents adhesion between the spacer and the first electrode or the second electrode.

A surface of the second electrode or first electrode from which the spacer is detached depending on whether a voltage is applied to the micro-optical switching device may include a rough portion.

Each of the plurality of openings may include at least one of the group consisting of a circular shape, an oval shape, and a polygonal shape.

According to an aspect of another exemplary embodiment, an image display apparatus includes: a backlight unit that emits light; and a display panel that includes a plurality of micro-optical switching devices described above and displays an image by adjusting an amount of light that is transmitted through the display panel from the backlight unit.

The image display apparatus may further include a diffusion plate disposed between the backlight unit and the display panel which diffuses light emitted from the backlight unit.

The display panel may further include an optical film which modifies a path of light that is transmitted through each of the micro-optical switching devices.

According to an aspect of another exemplary embodiment, a method of manufacturing a micro-optical switching device includes: forming a first electrode on a substrate, wherein the first electrode includes a first opening array including a plurality of openings; forming a sacrificial layer covering the first electrode; forming a second electrode on the sacrificial layer, wherein the second electrode includes a second opening array comprising a plurality of openings, wherein the plurality of openings of the second opening array do not overlap with the plurality of openings of the first opening array; and removing the sacrificial layer.

Each of the first electrode and the second electrode may include an opaque conductive material.

The method may further include: removing a portion of the sacrificial layer so that the substrate is exposed to the outside; and forming a support member that supports the second electrode, in a region formed by removing a portion of the sacrificial layer.

The method may further include, before the forming of the first electrode, forming a reflection layer on the substrate, or before the forming of the second electrode, forming a reflection layer on the sacrificial layer.

The method, before the forming of the sacrificial layer, may further include forming an insulating layer between the first electrode and the second electrode.

The insulating layer may be formed in a region in which the first electrode and the second electrode overlap with each other.

The method, after the removing of the sacrificial layer, may further include forming an insulating layer that prevents contact between the first electrode and the second electrode.

BRIEF DESCRIPTION OF THE DRAWINGS

These and/or other exemplary aspects and advantages will become apparent and more readily appreciated from the following description of exemplary embodiments, taken in conjunction with the accompanying drawings in which:

FIG. 3 is a cross-sectional view of the micro-optical switching device illustrated in FIG. 1 when it is turned on;

FIG. 4 is a cross-sectional view of an image display apparatus including a micro-optical switching device, according to an exemplary embodiment;

DETAILED DESCRIPTION

Figure 1:
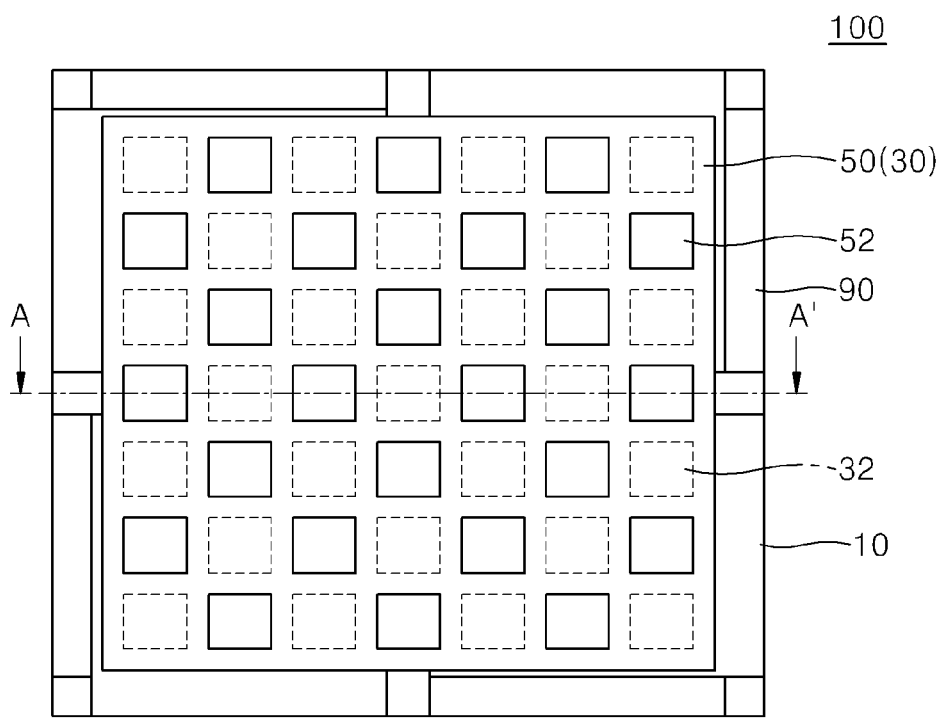
FIG. 1 is a plane view of a micro-optical switching device according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Exemplary embodiments will now be described more fully with reference to the accompanying drawings.

Figure 2:
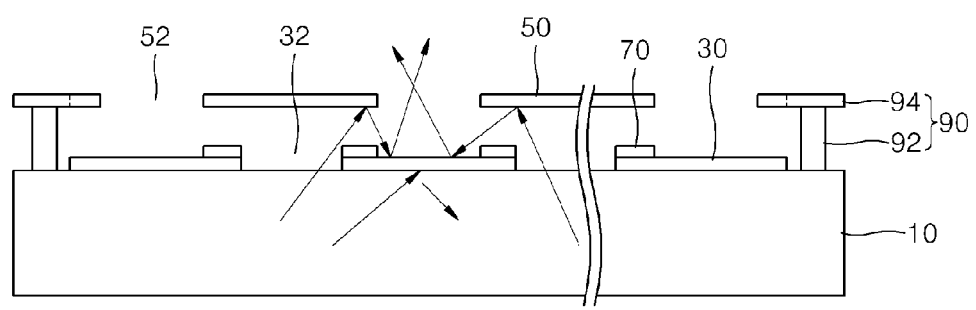
FIG. 2 is a cross-sectional view of the micro-optical switching device illustrated in FIG. 1 when it is turned off.
Figure 3:
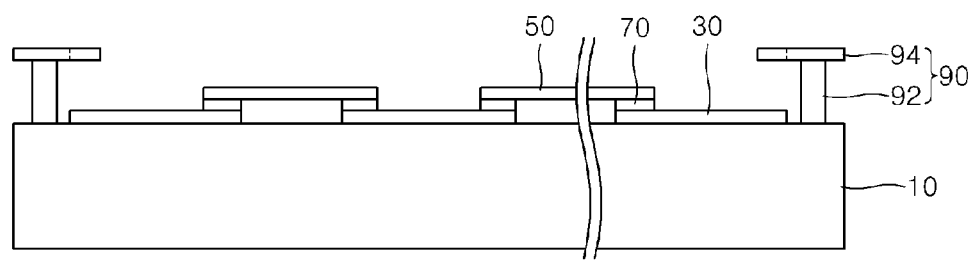

FIG. 1 is a plane view of a micro-optical switching device 100 according to an exemplary embodiment, and FIG. 2 is a cross-sectional view of the micro-optical switching device 100 illustrated in FIG. 1 when it is turned off, and FIG. 3 is a cross-sectional view of the micro-optical switching device 100 illustrated in FIG. 1 when it is turned on.

As illustrated in FIGS. 1 through 3, the micro-optical switching device 100 may include a lower electrode 30 that is disposed on a substrate 10 and an upper electrode 50 that is disposed spaced apart from the lower electrode 30. The substrate 10 may be formed of a transparent amorphous material through which light may be transmitted, such as glass or the like.

Each of the lower and upper electrodes 30 and 50 may be formed of a conductive material which is not entirely transparent. In detail, the lower and upper electrodes 30 and 50 may be formed of an opaque conductive material with high reflectivity. The lower and upper electrodes 30 and 50 may be formed as a carbon nano-structure formed of carbon nanotube (CNT), graphene, or the like, or may be formed of conductive polymer, such as polypyrrole, polyaniline, polyacetylene, polythiophene, polyphnylene vinylene, polyphenylene sulfide, poly p-phenylene or polyheterocycle vinylene, or metal oxide, such as indium tin oxide (ITO), aluminum zinc oxide (AZO), indium zinc oxide (IZO), tin oxide ($SnO_2$), or $In_2O_3$, or may be formed as a metal nano-particle diffusion thin layer formed of at least one metallic material selected from the group consisting of aluminum (Al), copper (Cu), gold (Au), and silver (Ag). The lower and upper electrodes 30 and 50 may also be formed of a colored material, such as a black material, which is non-transparent. Also, bottom surfaces of the lower electrode 30 and the upper electrode 50 may be coated with a reflective material.

The lower electrode 30 may include a first opening array including a plurality of openings 32, and the upper electrode 50 may also include a second opening array including a plurality of openings 52. The first and second opening arrays are disposed so that they do not overlap with each other so that the micro-optical switching device 100 may intercept light or allow light to be transmitted through the first and second opening arrays by moving the upper electrode 50 in an upward or downward direction (away from or closer to the lower electrode). Although FIG. 1 illustrates the openings 32 included in the first opening array and the openings 52 included in the second opening array having a rectangular shape, the present embodiment is not limited thereto. The shapes of the openings 32 and 52 may include at least one of the group consisting of a circular shape, an oval shape, and a polygonal shape. Also, the sizes thereof may be the same or different.

In addition, the micro-optical switching device 100 may further include a spacer 70 that prevents electrical shorts between the lower electrode 30 and the upper electrode 50. The spacer 70 may also be formed of a non-transparent material, for example, the spacer 70 may be formed from at least one insulating material selected from the group consisting of $ZrO_2$, $TiO_2$, $MgO$, $CeO_2$, $Al_2O_3$, $HfO_2$, $NbO$, $SiO_2$, and $Si_3N_4$. The spacer 70 may be disposed between the lower electrode 30 and the upper electrode 50, i.e., in a region in which the lower electrode 30 and the upper electrode 50 overlap with each other. The spacer 70 may be disposed on a top surface of the lower electrode 30, as illustrated in FIGS. 2 and 3. However, the present embodiment is not limited thereto, and the spacer 70 may also be disposed on the bottom surface of the upper electrode 50.

The micro-optical switching device 100 may further include a support member 90 that supports the upper electrode 50 in such a way that the upper electrode 50 is spaced apart from the lower electrode 30 by a predetermined distance. The support member 90 may extend from the upper electrode 50 and may be connected to the substrate 10. For example, the support member 90 may include a first support member 92 that is disposed on the substrate 10 and spaced apart from the lower electrode 30 and a second support member 94 that is disposed on the first support member 92 and extends from the upper electrode 50. The thickness of the first support member 92 may be determined according to the magnitudes of the voltages that are applied to the lower electrode 30 and the upper electrode 50. For example, as the magnitudes of the voltages applied to the lower electrode 30 and the upper electrode 50 increase, the thickness of the first support member 92 may be increased. In this regard, the thickness of the first support member 92 may be greater than the sum of the thicknesses of the lower electrode 30 and the spacer 70. Thus, the upper electrode 50 may be spaced apart from the lower electrode 30 by a predetermined distance due to the support member 90.

The support member 90 may be disposed outside the lower electrode 30 and the upper electrode 50, and a plurality of support members 90 may support the upper electrode 50. When there are a plurality of support members 90, the plurality of support members 90 may be disposed to be symmetrical with each other about a center of the upper electrode 50.

The support member 90 may be formed of an elastic material. For example, the support member 90 may be formed of an elastic conductive material or elastic polymer with elasticity. For conveniences of manufacture, the support member 90 may be formed of the same material as that used in forming the upper electrode 50. However, the present embodiment is not limited thereto, and the support member 90 may be formed of elastic polymer with high elasticity. For example, the support member 90 may be formed of at least one elastic polymer selected from the group consisting of silicon, polysiloxanes, polyurethanes, polysilicon-polyurethanes, rubber, ethylene-vinyl acetate copolymer, phnolic nitrile rubber, styrene butadiene rubber, polyether-block-amides, and polyolefins, or other similar materials to elastic polymer, such as various types of gels.

The micro-optical switching device 100 operates as described below depending on whether a voltage is applied thereto.

When no voltage is applied to the micro-optical switching device 100, the upper electrode 50 of the micro-optical switching device 100 may be spaced apart from the lower electrode 30 due to an intrinsic elastic force of the support member 90, as illustrated in FIG. 2. Thus, light that is incident on the substrate 10 is emitted through the first opening array of the lower electrode 30 and the second opening array of the upper electrode 50 to the outside. In this case, the first and second opening arrays do not overlap with each other. Thus, some incident light may be directly transmitted through the first and second opening arrays or may be reflected by the lower electrode 30 or the upper electrode 50 and thus may be emitted to the outside.

However, when a voltage is applied to the micro-optical switching device 100, the upper electrode 50 of the micro-optical switching device 100 is moved in a downward direction and is disposed on the spacer 70, and the support member 90 may expands due to the movement of the upper electrode 50. Since the first and second opening arrays do not overlap with each other, light that is incident on the substrate 10 is reflected by the lower electrode 30 and the upper electrode 50 and thus is not transmitted through the first and second opening arrays.

Also, when the voltage applied to the micro-optical switching device 100 stops, the support member 90 may be restored to its original state. In this manner, depending on whether a voltage is applied to the micro-optical switching device 100, the upper electrode 50 may be moved in the upward or downward direction so that the light that is incident on the substrate 10 may be transmitted through the first and second opening arrays or may be intercepted.

Although, in FIGS. 2 and 3, the light that is incident on the substrate 10 is transmitted through the first and second opening arrays or is intercepted due to the upward or downward direction of the upper electrode 50, the present embodiment is not limited thereto. Since the spacing between the upper electrode 50 and the lower electrode 30 may be adjusted according to the magnitude of the voltage applied to the micro-optical switching device 100, the amount of light transmitted through the first and second opening arrays may also be adjusted.

The micro-optical switching device 100 may be an element of a display panel 2 (see FIG. 4) that displays an image by intercepting light or allowing light to be transmitted through the display panel 2.

FIG. 4 is a cross-sectional view of an image display apparatus including a plurality of micro-optical switching devices 100, according to an exemplary embodiment. Referring to FIG. 4, the image display apparatus includes a display panel 2 that includes the plurality of micro-optical switching devices 100 and is surrounded by a lower display plate 200 and an upper display plate 500 and a backlight unit 1 that is disposed under the display panel 2.

The backlight unit 1 may include a light source and a light guide panel (LGP) that are elements for providing light to the display panel 2. The display panel 2 may further include a diffusion plate 300 that diffuses light emitted from the backlight unit 1.

The display panel 2 may display an image by intercepting light that is emitted from the backlight unit 1 or by allowing the light to be transmitted through the display panel 2. The display panel 2 adjusts the amount of transmitted light by using the micro-optical switching devices 100.

The display panel 2 is surrounded by the lower display plate 200 and the upper display plate 500. The upper display plate 500 and the lower display plate 200 are formed of glass or the like and allow light to be transmitted therethrough. The micro-optical switching devices 100, and an optical film 400, may be disposed between the lower display plate 200 and the upper display plate 500.

One of the micro-optical switching devices 100 may be disposed in each pixel. Various voltages may be applied to the micro-optical switching devices 100, and the amount of light that is transmitted through the first and second opening arrays when the upper electrode 50 is moved in the upward or downward direction is adjusted according to the voltages applied to the micro-optical switching devices 100.

Although light that is emitted from the backlight unit 1 may be transmitted through the micro-optical switching devices 100 through the first opening array of the lower electrode 30 and the second opening array of the upper electrode 50, some light may be reflected from the lower electrode 30 or the upper electrode 50. The reflected light is incident on the backlight unit 1, is re-reflected from the backlight unit 1 and is incident again on the micro-optical switching devices 100 and is reused. Since light that is not transmitted through the micro-optical switching devices 100 is re-reflected from the backlight unit 1 and is incident on the micro-optical switching devices 100, as described above, power consumption of the image display apparatus may be reduced and luminescent efficiency thereof may be improved by using the micro-optical switching devices 100.

The optical film 400 is used to modify a path of light that is incident from the micro-optical switching devices 100 so as to make the light incident on the upper display plate 500. The optical film 400 may be a prism, a diffusion plate, a polarization plate, or the like.

Although not shown, wirings for applying signals to the micro-optical switching devices 100 may be disposed on the lower display plate 200 or the upper display plate 500.

In addition, the upper display plate 500 may include a black matrix and color filters. The black matrix may be used to prevent light, other than light that is used in displaying an image, from proceeding in the upward direction. The color filters are disposed in units of pixels that are units for displaying an image, and the black matrix is disposed between the color filters so as to distinguish the pixels. The color filters are used to add a sense of color to the light that is emitted from the backlight unit 1 and may generally be red, green, and blue color filters.

Hereinafter, a method of manufacturing the micro-optical switching device 100, according to an exemplary embodiment, will be described.

FIGS. 5A through 5I are cross-sectional views illustrating a method of manufacturing the micro-optical switching device 100, according to an exemplary embodiment.

Figure 5A:
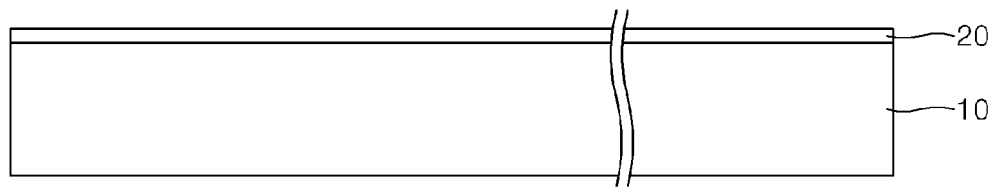
FIGS. 5A through 5I are cross-sectional views illustrating a method of manufacturing a micro-optical switching device, according to an exemplary embodiment.

First, referring to FIG. 5A, a first conductive material layer 20 with a light-intercepting property is formed on a transparent substrate 10. The first conducive material layer 20 may be formed of an opaque conductive material with low light transmittance and high reflectivity. For example, the first conductive material layer 20 may be formed as a carbon nanostructure formed of CNT, graphene, or the like or is formed of conductive polymer, such as polypyrrole, polyaniline, polyacetylene, polythiophene, polyphnylene vinylene, polyphenylene sulfide, poly p-phenylene or polyheterocycle vinylene, or metal oxide, such as indium tin oxide (ITO), aluminum zinc oxide (AZO), indium zinc oxide (IZO), tin oxide ($SnO_2$), or $In_2O_3$, or is formed as a metal nano-particle diffusion thin layer formed of at least one metallic material selected from the group consisting of aluminum (Al), copper (Cu), gold (Au), and silver (Ag) may be formed on the transparent substrate 10.

Figure 5B:
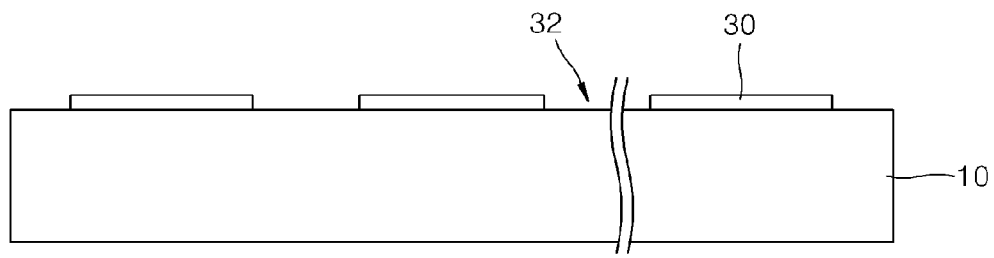
Figure 5C:
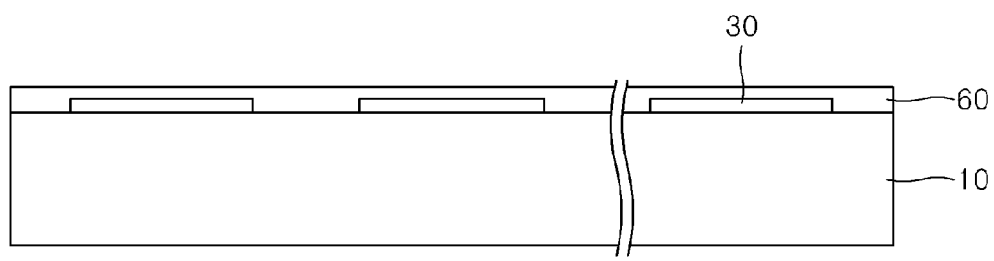
Figure 5D:
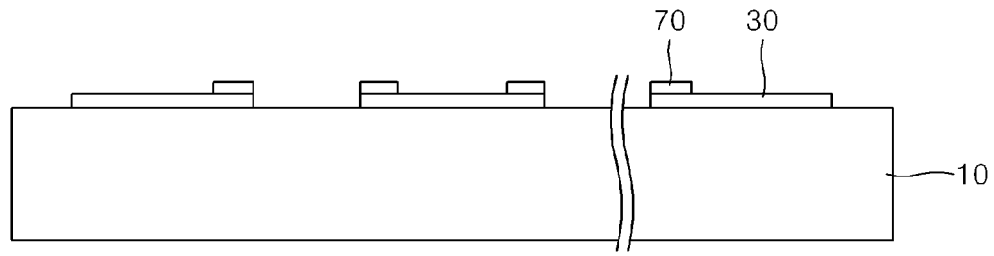

Referring to FIG. 5B, the first conductive material layer 20 is patterned, thereby forming a lower electrode 30 including a first opening array including a plurality of openings 32. Then, referring to FIG. 5C, an insulating layer 60 is formed on the lower electrode 30 and the transparent substrate 10. The insulating layer 60 may be formed of a non-transparent material, for example, an opaque material which may be at least one insulating material selected from the group consisting of $ZrO_2$, $TiO_2$, MgO, $CeO_2$, $Al_2O_3$, $HfO_2$, NbO, $SiO_2$, and $Si_3N_4$. Next, referring to FIG. 5D, the insulating layer 60 is patterned, thereby forming a spacer 70 on a portion of the top surface of the lower electrode 30. The spacer 70 may be formed on the entire top surface of the lower electrode 30 or in a portion of the top surface of the lower electrode 30.

Figure 5E:
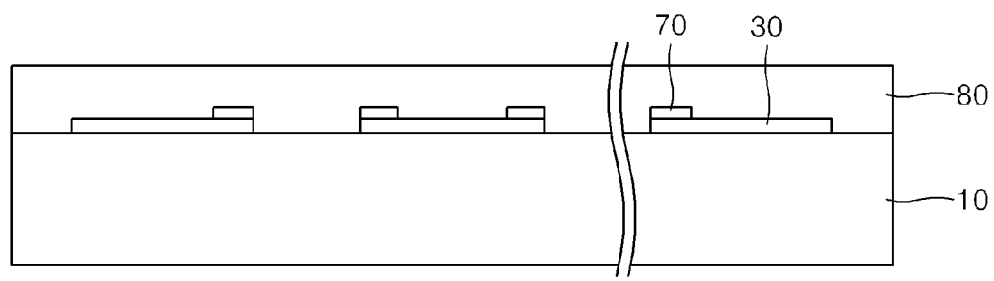
Figure 5F:
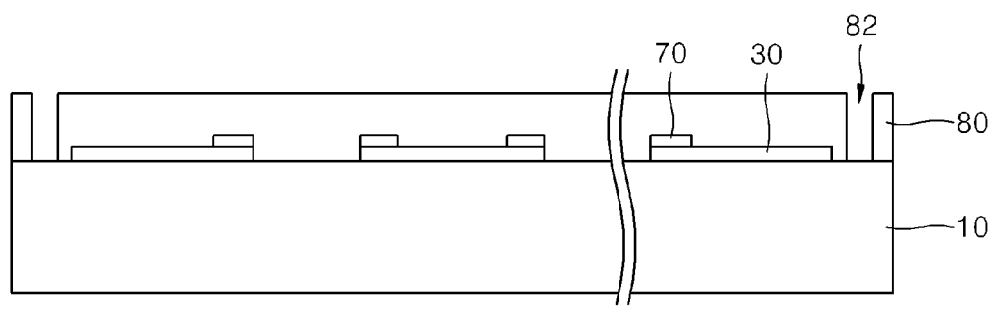

Referring to FIG. 5E, a sacrificial layer 80 that covers the lower electrode 30 and the spacer 70 is formed on the transparent substrate 10. The sacrificial layer 80 may be formed of a photosensitive material, for example, a solvent that is volatized from a solid powder that chemically reacts with light. Then, referring to FIG. 5F, the sacrificial layer 80 is patterned, thereby forming an opening 82 for exposing a portion of the transparent substrate 10. The opening 82 is formed outside the lower electrode 30 and may be distanced therefrom.

Figure 5G:
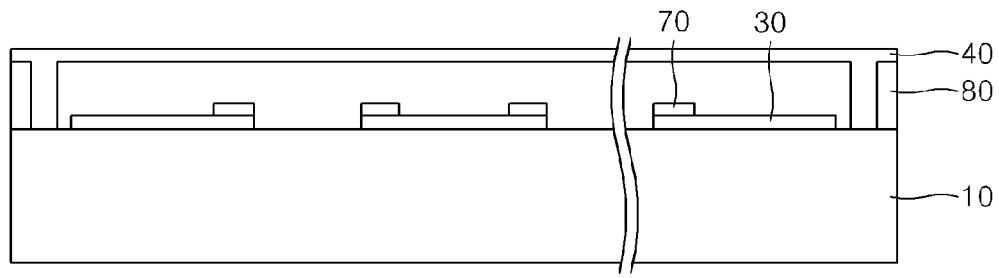
Figure 5H:
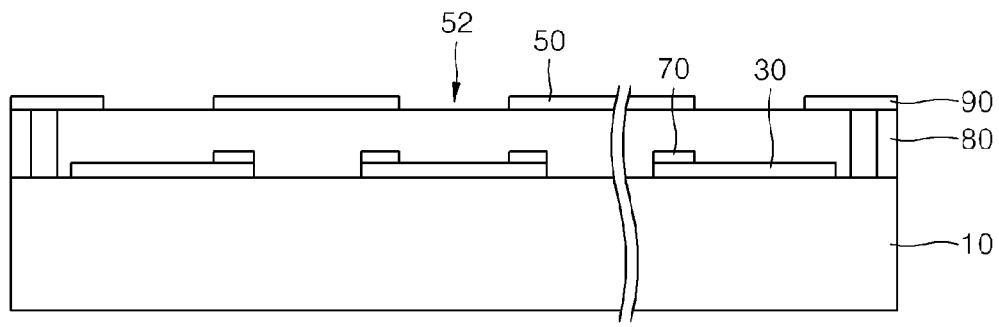

Referring to FIG. 5G, a second conductive material layer 40 that covers the sacrificial layer 80 is formed on the transparent substrate 10. The second conductive material layer 40 may be the same as the first conductive material layer 20 or different therefrom. The second conductive material layer 40 may be formed of a conductive material with elasticity. In addition, the second conductive material layer 40 is patterned, thereby forming an upper electrode 50 and a support member 90, as illustrated in FIG. 5H. A central portion of the second conductive material layer 40 is patterned in such a way that a second opening array including a plurality of openings 52 is formed not to overlap with the first opening array, thereby forming the upper electrode 50. In addition, when the upper electrode 50 is formed, the central portion of the second conductive material layer 40 is patterned in such a way that the spacer 70 is disposed between the second conductive material layer 40 of the upper electrode 50 and the first conductive material layer 20 of the lower electrode 30. Then, the remaining portion of the second conductive material layer 40 is patterned to form the support member 90. The support member 90 is formed by patterning edge portions of the second conductive material layer 40. The edge portions of the second conductive material layer 40 include a portion of the second conductive material layer 40 formed in the opening 82. The portion of the second conductive material layer 40 formed in the opening 82 may be a first support member 92, and an upper portion of the opening 82 and a portion of the second conductive material layer 40 that is disposed at a perimeter of the opening 82 may be a second support member 94.

Figure 5I:
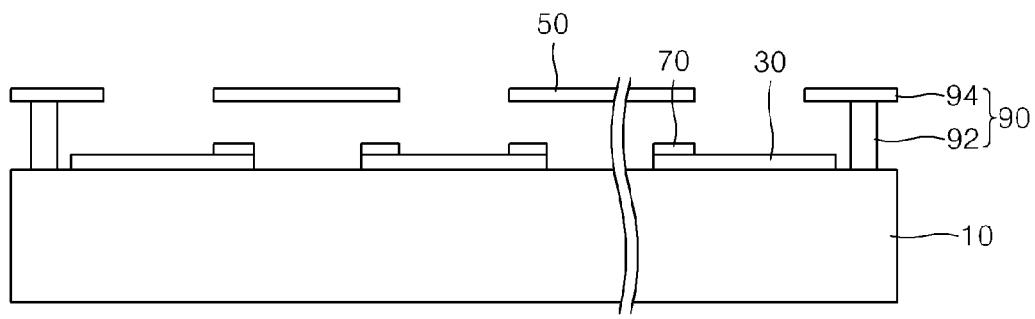

Last, the sacrificial layer 80 is removed, as illustrated in FIG. 5I. For example, the sacrificial layer 80 may be removed in an etching process.

In the current embodiment, the spacer 70 is formed after the lower electrode 30 is formed. However, the present embodiment is not limited thereto. The spacer 70 may also be formed on a top surface of the lower electrode 30 or a bottom surface of the upper electrode 50 after the sacrificial layer 80 is removed. Also, in the current embodiment, the support member 90 is formed from the second conductive material layer 40 that is formed of the same material as that used in forming the upper electrode 50. However, the present embodiment is not limited thereto. The support member 90 may be formed of material that is different from material used in forming the second conductive material layer 40, for example, elastic polymer. In this way, when the support member 90 is formed of material that is different from material used in forming the upper electrode 50, the upper electrode 50 may be formed after the support member 90 is formed, or the support member 90 may be formed after the upper electrode 50 is formed.

The upper electrode 50 of the micro-optical switching device 100 is detached from the spacer 70 depending on whether a voltage is applied to the micro-optical switching device 100. Thus, an adhesion-preventing material may be coated between the upper electrode 50 and the spacer 70, or an unevenness portion may be formed on the bottom surface of the upper electrode 50 so that the spacer 70 and the upper electrode 50 may easily detach from each other.

Figure 6:
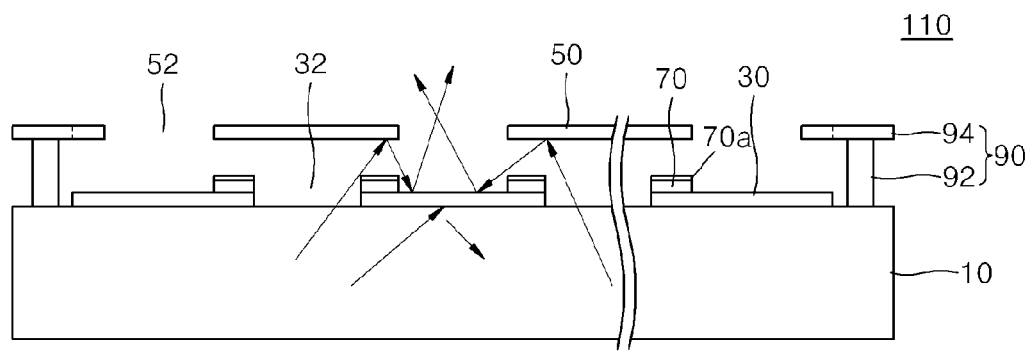
FIG. 6 is a cross-sectional view of a micro-optical switching device according to another exemplary embodiment.
Figure 7:
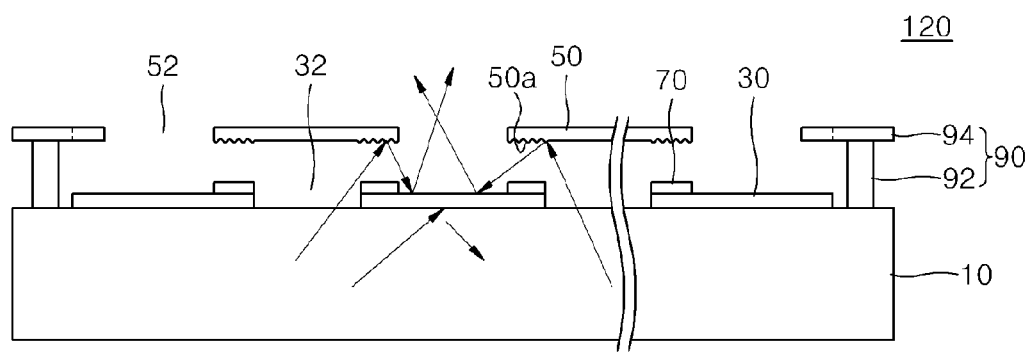
FIG. 7 is a cross-sectional view of a micro-optical switching device according to another exemplary embodiment.

FIG. 6 is a cross-sectional view of a micro-optical switching device 110 according to another exemplary embodiment, and FIG. 7 is a cross-sectional view of a micro-optical switching device 120 according to another exemplary embodiment.

Referring to FIG. 6, when a bottom surface of a spacer 70 is disposed on a top surface of a lower electrode 30, a material layer 70a that prevents adhesion between the spacer 70 and the upper electrode 50 may be formed on a top surface of the spacer 70. Although, in FIG. 6, the material layer 70a that prevents adhesion between the spacer 70 and the upper electrode 50 is disposed on the spacer 70, the present embodiment is not limited thereto. For example, the material layer 70a may be disposed on a bottom surface of an upper electrode 50. Alternatively, if the spacer 70 is disposed on the bottom surface of the upper electrode 50, the material layer 70a may be disposed on the bottom surface of the spacer 70 or the top surface of the lower electrode 30.

In addition, referring to FIG. 7, an unevenness portion 50a that minimizes a contact area between the spacer 70 and the upper electrode 50 may be formed on the upper electrode 50 of the micro-optical switching device 120. The unevenness portion 50a may be formed on the entire bottom surface of the upper electrode 50 or in a portion of the bottom surface of the upper electrode 50 that corresponds to the spacer 70. Alternatively, the unevenness portion 50a may be formed on the top surface of the spacer 70. Alternatively, if the spacer 70 is disposed on the bottom surface of the upper electrode 50, the unevenness portion 50a may be formed on the bottom surface of the spacer 70 or the upper surface of the lower electrode 30.

As described above, according to the one or more of the above embodiments, a micro-optical switching device may adjust the amount of transmitted light according to the upward or downward movement of an electrode.

In addition, light that is not transmitted through the micro-optical switching device is re-reflected and is incident so that luminescent efficiency of the micro-optical switching device may be improved.

In addition, since luminescent efficiency of the micro-optical switching device is improved, an image display apparatus that reduces power consumption may be provided.

Furthermore, the micro-optical switching device may be provided by using a simplified manufacturing process.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A micro-optical switching device comprising:
    a substrate;
    a first electrode disposed on the substrate and comprising a first opening array which comprises a plurality of openings;
    a second electrode spaced apart from the first electrode and comprising a second opening array which comprises a plurality of openings, wherein the plurality of openings of the second opening array do not overlap with the plurality of openings of the first opening array; and
    a spacer disposed in a region in which the first electrode and the second electrode overlap with each other,
    wherein the second electrode is configured to move in a direction perpendicular to a plane of the first electrode based on a voltage applied to the micro-optical switching device, such that, in a closed position, the second electrode and the first electrode contact the spacer, thereby blocking light from passing between the first electrode and the second electrode, and in an open position, one of the second electrode and the first electrode detaches from the spacer, thereby allowing light to pass between the first electrode and the second electrode.

2. The micro-optical switching device of claim 1, further comprising a support member that supports the second electrode in such a way that the second electrode is spaced apart from the first electrode by a predetermined distance.

3. The micro-optical switching device of claim 2, wherein the support member comprises:
    a first support member that is disposed on the substrate and has a greater thickness than a thickness of the first electrode; and
    a second support member that is disposed on the first support member and is connected to the second electrode.

4. The micro-optical switching device of claim 2, wherein the support member comprises a material which is the same as a material used in forming the second electrode.

5. The micro-optical switching device of claim 2, wherein the support member is formed of elastic polymer.

6. The micro-optical switching device of claim 1, wherein the second electrode is adjustable toward and away from the first electrode based on the voltage is applied to the micro-optical switching device.

7. The micro-optical switching device of claim 1, wherein, when a voltage is applied to the micro-optical switching device, the second electrode is moved in a downward direction such that the second electrode contacts the first electrode, and when no voltage is applied to the micro-optical switching device, the second electrode is moved in an upward direction such that the second electrode is separated from the first electrode.

8. The micro-optical switching device of claim 1, wherein each of the first electrode and the second electrode comprises an opaque material.

9. The micro-optical switching device of claim 1, wherein the first electrode and the second electrode are each coated with a reflective material.

10. The micro-optical switching device of claim 1, wherein the prevents electrical shorts between the first electrode and the second electrode.

11. The micro-optical switching device of claim 10, wherein the spacer is disposed on a top surface of the first electrode or bottom surface of the second electrode.

12. The micro-optical switching device of claim 10, wherein the spacer comprises:
    a first surface that is disposed on the bottom surface of the second electrode or top surface of the first electrode; and
    a second surface opposite the first surface which is coated with material that prevents adhesion between the spacer and the first electrode or the second electrode.

13. The micro-optical switching device of claim 10, wherein a surface of the second electrode or first electrode from which the spacer is detachable depending on whether a voltage is applied to the micro-optical switching device comprises a rough portion.

14. The micro-optical switching device of claim 1, wherein each of the plurality of openings comprises at least one of the group consisting of a circular shape, an oval shape, and a polygonal shape.

15. An image display apparatus comprising:
    a backlight unit that emits light; and
    a display panel comprising a plurality of micro-optical switching devices of claim 1, wherein the display panel displays an image by adjusting an amount of light transmitted through the display panel from the backlight unit.

16. The image display apparatus of claim 15, further comprising a diffusion plate disposed between the backlight unit and the display panel which diffuses light emitted from the backlight unit.

17. The image display apparatus of claim 15, wherein the display panel further comprises an optical film which modifies a path of light that is transmitted through each of the micro-optical switching devices.

18. A method of manufacturing a micro-optical switching device, the method comprising:

forming a first electrode on a substrate, wherein the first electrode comprises a first opening array comprising a plurality of openings;

forming a spacer on the first electrode;

forming a sacrificial layer covering the first electrode and the spacer;

forming a second electrode on the sacrificial layer, wherein the second electrode comprises a second opening array comprising a plurality of openings, wherein the plurality of openings of the second opening array does not overlap with the plurality of openings of the first opening array; and removing the sacrificial layer;

wherein the spacer is disposed in a region in which the first electrode and the second electrode overlap with each other, and the second electrode is configured to move in a direction perpendicular to a plane of the first electrode based on a voltage applied to the micro-optical switching device, such that, in a closed position, the second electrode and the first electrode contact the spacer, thereby blocking light from passing between the first electrode and the second electrode, and in an open position, one of the second electrode and the first electrode detaches from the spacer, thereby allowing light to pass between the first electrode and the second electrode.

19. The method of claim 18, wherein each of the first electrode and the second electrode comprises an opaque conductive material.

20. The method of claim 18, further comprising:
removing a portion of the sacrificial layer so that the substrate is exposed to the outside; and
forming a support member that supports the second electrode, in a region formed by removing a portion of the sacrificial layer.

21. The method of claim 18, further comprising, before the forming of the first electrode, forming a reflection layer on the substrate, or before the forming of the second electrode, forming a reflection layer on the sacrificial layer.

22. The method of claim 18, wherein the forming the spacer comprises
forming an insulating layer on the first electrode.

23. The method of claim 18, after the removing of the sacrificial layer, further comprising forming an insulating layer that prevents contact between the first electrode and the second electrode.

* * * * *